United States Patent
Taube et al.

[11] Patent Number: 5,640,799
[45] Date of Patent: Jun. 24, 1997

[54] AIR FLOW POWERED AERATOR

[76] Inventors: Michael Taube, 21532 Edgewater Dr., Port Charlotte, Fla. 33952; Jeffrey DeYoung, 4444 Larkspur Ct., Port Charlotte, Fla. 33948; Timothy DeYoung, 2690 Auburn St., Port Charlotte, Fla. 33948

[21] Appl. No.: 496,926

[22] Filed: Jun. 30, 1995

[51] Int. Cl.$^6$ .................................................. A01K 97/05
[52] U.S. Cl. ........................................... 43/57; 261/121.2
[58] Field of Search .............................. 43/55, 56, 57; 261/121.2

[56] References Cited

U.S. PATENT DOCUMENTS

| | | | |
|---|---|---|---|
| 1,991,149 | 2/1935 | Haislip | 43/56 |
| 2,460,527 | 2/1949 | Oliveros | 43/57 |
| 2,512,791 | 6/1950 | Cothern | 43/57 |
| 2,680,646 | 6/1954 | Bush | 261/121.2 X |
| 2,738,613 | 3/1956 | Styer | 261/121.2 X |
| 3,348,826 | 10/1967 | Karley | 261/121.2 |
| 4,677,785 | 7/1987 | Lambourn | 43/55 |
| 4,710,324 | 12/1987 | Vesnaver | 261/121.2 X |
| 4,776,127 | 10/1988 | Jackson | 43/57 |
| 4,790,964 | 12/1988 | Swanson | 261/121.2 |
| 4,862,634 | 9/1989 | Surface | 43/55 |
| 4,896,452 | 1/1990 | Smith et al. | 43/57 |
| 4,996,790 | 3/1991 | Ruggles | 43/55 |
| 5,193,301 | 3/1993 | Figgins | 43/57 |

*Primary Examiner*—Joseph J. Hail, III
*Assistant Examiner*—Jay A. Stelacone
*Attorney, Agent, or Firm*—Frank A. Lukasik

[57] ABSTRACT

A device for aerating a bait tank using only air flow as the source of power. An ambient air driven propeller or fan mounted on a shaft positioned in a generally cylindrical housing is provided. A crank section formed in the shaft produces a reciprocating motion which operates a piston rod that is connected to the shaft at one end and to a diaphragm or bellows having a check valve at the other end. A tube or other conduit connected to the outlet of the check valve directs a unidirectional flow of aerating air to the bottom of the tank. An air stone or air brick may be secured in the bottom of the tank in the path of the aerating air flow to enhance dispersion into the bait tank.

1 Claim, 3 Drawing Sheets

5,640,799

1
AIR FLOW POWERED AERATOR

BACKGROUND OF THE INVENTION

1. Field of the Invention

This invention relates to an aerating device and more particularly to a system for introducing oxygen into said circulating water within a live bait bucket or other such device that would be attached to or carried on a boat or a land vehicle. The aerating device is operated by air movement relative to the motion of the vehicle on which it is carried.

2. Description of the Prior Art

Heretofore, devices for supplying oxygen to small, contained volumes of water such as bait buckets, fish tanks or the like, particularly when in transit, have been directed to electrically driven means and when stationary, to holes in an outer or inner bucket or other container through which lake, river, or ocean water can flow. The latter containers are pertinent to the invention since they must be transported to or from the shore, dock or boat to ensure that an adequate amount of oxygen is supplied when removed from or carried to the water environment. For example, U.S. Pat. No. 4,677,785 to Lambourn concerns an aerated live bait bucket having a bottom appendage which contains battery-operated aerating equipment. The appendage is adapted to admit ambient air which is forced by a bellows through a vertical passageway in a tube or other conduit that is inserted in sealed relationship through the bottom of the bucket, this passageway terminating in a check valve disposed within the bucket which permits unidirectional flow only of air into the bucket.

U.S. Pat. No. 4,862,634 to Surface discloses a bait container having a reduced volume upper chamber and a pivotable porous separating means adapted to separate the upper chamber from a main lower chamber so that, when inverted, fish or other bait are allowed to enter the upper chamber after which the separating means is actuated to confine the bait in the upper chamber. The confined bait is retrieved by hand when the container is returned to the upright position.

U.S. Pat. No. 4,996,790 to Ruggles concerns a floating bait bucket having a catamaran-shaped external hull which is perforated to allow the flow of water therethrough to refresh the bait in the twin hulls of the catamaran. Flow-through openings are formed in the ends of each of the twin hulls of the catamaran sides to allow the flow of water therethrough.

It can be readily appreciated that these references, either singly or in combination, do not suggest or infer the aerating device of the present invention which provides an ambient air driven propeller and shaft that provides reciprocating motion to a diaphragm equipped with a one-way valve for forcing air into a bait bucket or other container, no shown through a tube to an air stone or air brick confined in the bottom of the container. On depression, air is forced out of the diaphragm into the tube and from there down to, into, and through the air stone thereby aerating and circulating the water in the tank or container. On upward motion, the diaphragm is extended, drawing air through the one-way valve and repeating the cycle. Reviewing the cited U.S. patents, in Lambourn a battery operated bellows positioned beneath the bait bucket is required. The device in Surface relates only to retrieval of bait, while Ruggles is directed to providing aeration through flow-through openings in the twin hulls of a catamaran. The German patents are unrelated to aeration and disclose no structure or structures comparable to those of the present invention.

2
SUMMARY OF THE INVENTION

Accordingly, it is an object of the invention to provide a device for aerating and circulating the water within a livebait tank or similar container during transport thereof using relative air motion as the motive force.

It is another object of the invention to provide such a device wherein all of the operative components are contained in a casing adapted to be carried on a land vehicle or a surface vessel, with aerating air delivered to the bottom of the tank.

It is a still further object of the invention to provide such a device or arrangement wherein relative air motion imparts a reciprocating action to a bellows whose output is conducted to the tank via a one-way valve contained in the casing.

It is yet another object of the invention to provide an aerating device that, in the preferred embodiment, does not require electrically driven means to circulate aerating air but may easily be adapted to do outside the tank or container when there is insufficient air motion to generate a reciprocating motion for actuation of a check valve means.

The foregoing objects are realized by the present invention in a system wherein a natural flow of ambient air or an air flow generated by a moving vehicle is directed into a casing having an opening at one end for directing air to the blades of a propeller or a fan and adequate openings at the opposite end for allowing a sufficient volume of the moving air to exit so as to generate the desired propeller speed. The propeller is mounted on a shaft that has an offset portion which is connected to a crankshaft, a piston and a bellows device so that rotation of the shaft causes a reciprocating motion of the piston and bellows device. The piston and the bellows device are contained in a housing that is open to ambient air, and the bellows device includes an intake for admitting air thereinto and in a one-way valve for expelling air into an outlet having a tubing or hose attached thereto which is connected to the bottom of a tank or container to be airated. An optional DC motor may be connected to the shaft to provide for rotation thereof when there is inadequate air flow.

BRIEF DESCRIPTION OF THE DRAWINGS

The foregoing and further objects of the invention will become apparent from reading the following detailed description of preferred embodiments of the invention, in which.

DETAILED DESCRIPTION OF THE INVENTION

Figure 1:
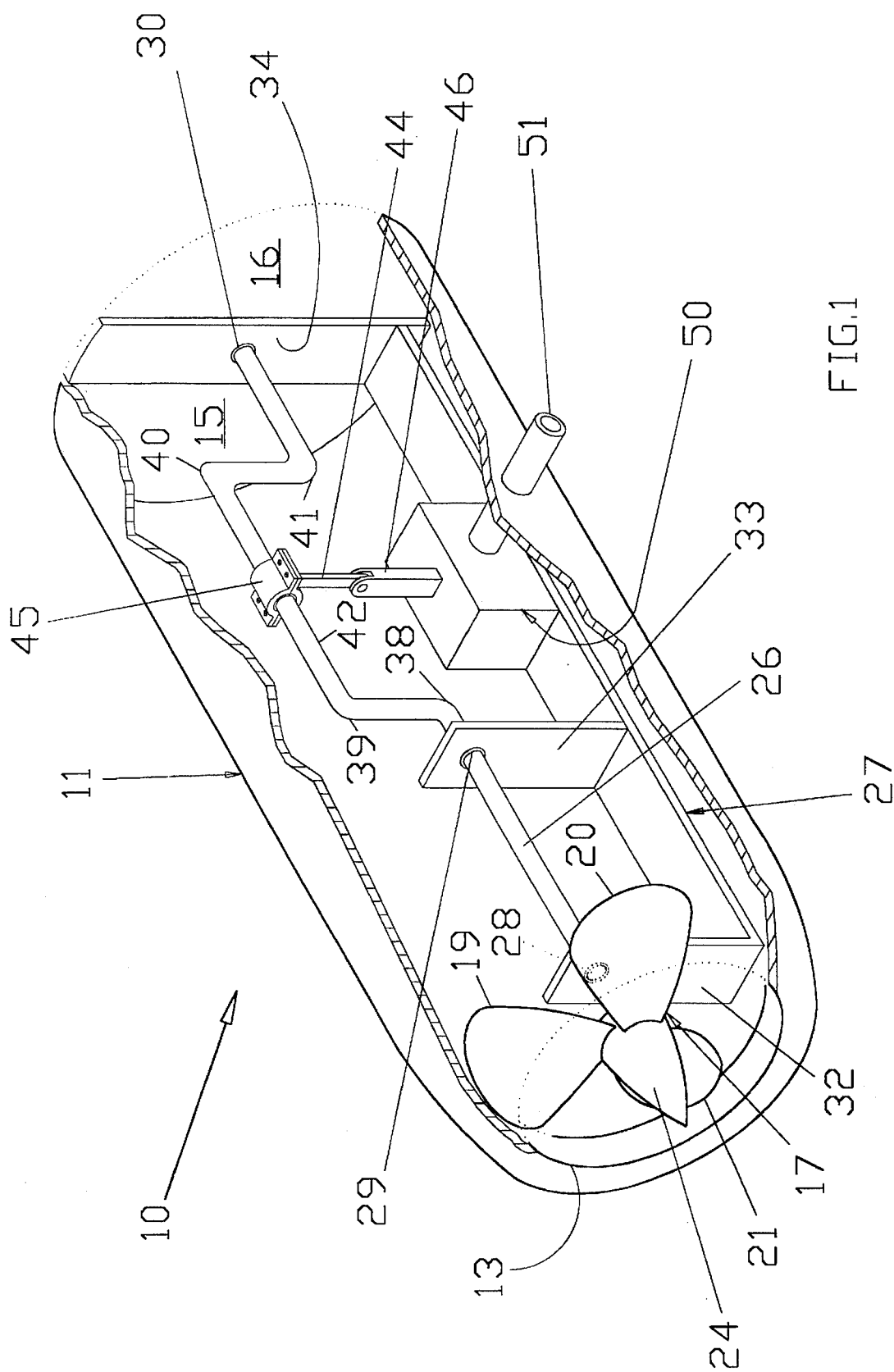
FIG. 1 is a perspective view of the invention partly cutaway.
Figure 2:
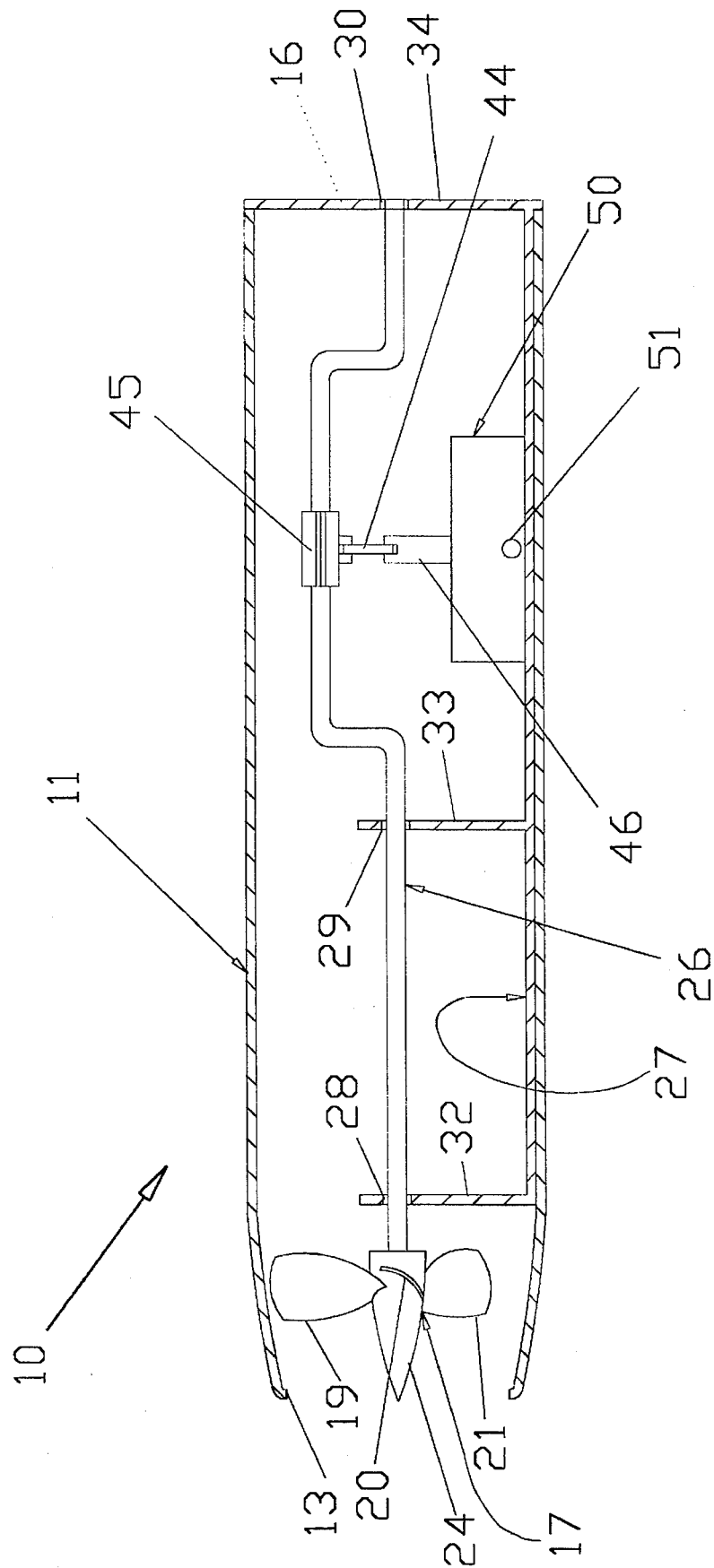
FIG. 2 is a side elevation, partly in section, of the embodiment shown in FIG. 1.

Turning now to FIGS. 1 and 2 of the drawings, there is shown a preferred embodiment of the invention 10 comprising an outer generally cylindrical housing or casing 11 having an opening 13 at one end and openings 15 and 16 at the opposite end. A propeller 17 having blades 19–21 and a nacelle 24 is positioned adjacent to opening 13 and is connected to a drive shaft 26 mounted in a support frame 27 which is provided with conventional shaft bearings 28–30 in upstanding members 32–34. Shaft 26 is bent at 38–41 to form a crank 42 which imparts reciprocating action to a pivotally mounted connecting rod 44 when shaft 26 is rotated about its longitudinal axis. Rod 44 is pivotally connected to a split bearing 45 mounted on shaft 28 at one end and to a piston rod 46 at its other end. A conventional form of bellows, not shown, is secured in conventional manner in a partially sealed chamber 50. The piston rod 46 and bellows, (not shown) are connected in chamber 50 to a conventional one-way socket valve, (not shown) that is connected to the bellows outlet 51, the piston rod 46 and bellows acting to produce a unidirectional flow of air through a pipe 51, and, through a hose or tubing, (not shown), connected at one end to pipe 51 and at its other end to a tank or container, (not shown) to introduce air through a sealed opening, (not shown) into the bottom of the tank or container to be airated. Such airation is enhanced by confining an air stone or air brick in a partial enclosure, (not shown), mounted above the sealed opening in the bottom of the tank or container.

Figure 3:
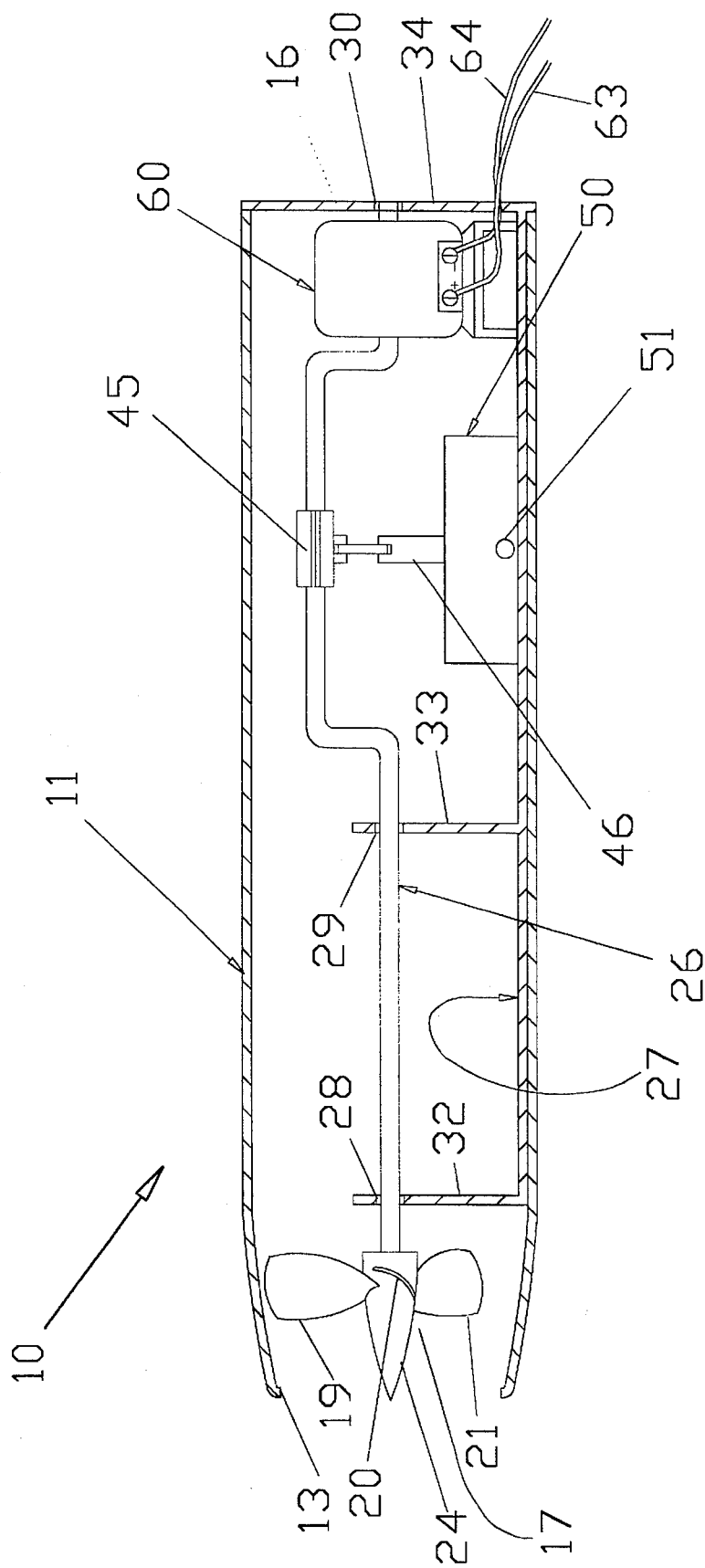
FIG. 3 is a side elevation, partly in section, of an alternate embodiment of the invention.

FIG. 3 illustrates an alternate embodiment of the invention wherein an auxiliary means 60 is added for producing rotation of shaft 26. Auxiliary means 60 is coupled to the end of shaft 26 remote from propeller 17 and includes a conventional DC motor, (not shown), and gears, (not shown), connecting the motor to shaft 26. A battery or other DC power means, (not shown) energizes the DC motor via wires 63 and 64.

In operation, housing 11 may be deployed in an open area on a vehicle, either land or water, and with an adequate air flow through the housing, a bait tank or similar device containing marine life that requires oxygen for survival may be aerated via a stream of air forced through pipe 51 by means of a bellows and one-way valve connected thereto and to a sealed inlet in the tank or device. Such aeration may be provided for long periods of time by the present invention without a need for batteries. If an interruption in air flow is anticipated, the alternate embodiment of the invention may be used. In the alternate, battery-assisted, embodiment it will be appreciated that the gearing in auxiliary means 60 may be decoupled through housing 11, and coupled only when necessary due to inadequate air flow. This feature obviously serves to extend battery life far beyond that which is required in devices operated only by battery.

Although this invention has been disclosed and described generally in relation to a preferred embodiment, its principles are susceptible to other applications which will be apparent to persons skilled in the art. Hence, many modifications, additions, and deletions may be made to the invention without departure from the scope of the invention as set forth in the following claims.

What is claimed is:

1. A system for supplying oxygen to containers for holding water comprising:

an elongated housing having an opening at a first end and at least one opening at a second end for allowing air flow through said housing, a support frame mounted in said housing, said frame having a plurality of vertical, upstanding members affixed thereto, a shaft and a propeller rotatably mounted in shaft bearings located in said upstanding members affixed to said support frame, said shaft having a first end and a second end, said propeller being mounted on said first end and positioned near said first end opening, a crank formed in said shaft, a piston rod having a first and a second end, said first end pivotally connected to said crank for converting rotary motion of said shaft into reciprocating motion, and an air flow control means mounted on said support frame and connected to said piston rod second end, said air flow control means furnishing an output of a unidirectional flow of air through an output pipe for connection an auxiliary rotation means mounted on said frame and connected to said shaft at said shaft second end for aiding in rotation of said shaft and a source of electrical power connected to said auxiliary rotation means for driving said rotation means, whereby air flow through said housing causes rotation of said propeller and shaft thereby actuating said crank means and supplying air without requiring manual or electrical energy to aerate the water and in the event of a reduced air flow, said auxiliary rotation means may be energized to produce the desired reciprocating motion of said piston rod and therefore the desired air flow.

* * * * *